No. 794,466. PATENTED JULY 11, 1905.
H. ROBINSON.
EDUCATIONAL TOY.
APPLICATION FILED AUG. 6, 1904.

Witnesses
D. E. Burdine
Fannie Wise

Inventor:
Hanson Robinson,
by Dodge & Sons
Attorneys.

No. 794,466.

Patented July 11, 1905.

UNITED STATES PATENT OFFICE.

HANSON ROBINSON, OF HANOVER, PENNSYLVANIA, ASSIGNOR TO ELIZABETH ROBINSON, OF HANOVER, PENNSYLVANIA.

EDUCATIONAL TOY.

SPECIFICATION forming part of Letters Patent No. 794,466, dated July 11, 1905.

Application filed August 6, 1904. Serial No. 219,744.

*To all whom it may concern:*

Be it known that I, HANSON ROBINSON, a citizen of the United States, residing at Hanover, in the county of York and State of Pennsylvania, have invented certain new and useful Improvements in Educational Toys, of which the following is a specification.

My invention pertains to an educational toy designed to combine amusement and information, or to serve as a means of instruction, while at the same time interesting and amusing the person using it.

The invention consists in a hollow globe or sphere preferably having upon its exterior surface representations of the different bodies of land and water constituting the earth's surface, and a float within said globe or sphere carrying a permanent magnet, the globe being supplied with water, oil, or other liquid, so that the float may maintain a substantially constant position and hold the ends of the magnet against the interior surface of the globe and at or near the highest point therein. Combined with the parts recited is a movable toy or device having a bit of magnetic material (preferably of iron wire) on its base, which being attracted by the magnet will remain in substantially fixed relation to the magnet however the globe may be turned or moved. Steamer routes, cable-lines, ocean-currents, and the like may be indicated upon the surface of the globe, and the toy whether representing a person, a ship, or the like may be caused to traverse such routes and to reach different points of prominence or note indicated upon the globe. In this way the location of such points, the routes of steamers, the points visited in traversing said routes, and other matters of information will be learned and become fixed in the mind of the person using the toy, while considerable skill is required so to move the globe as to keep the external object always upon its proper path. To render the device more interesting or entertaining, obstacles may be placed within the globe and so arranged that only by careful manipulation can they be avoided and the external device made to reach a given point.

The invention is illustrated in the accompanying drawings, in which—

Figure 1:
Figure 2:
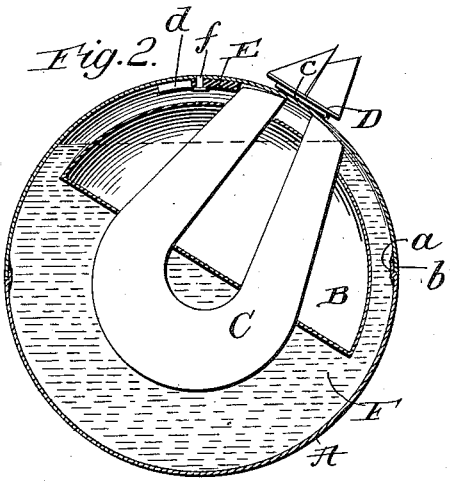
Figure 3:
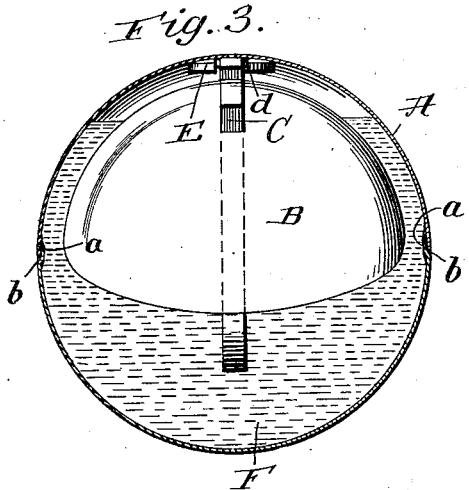
Figure 4:
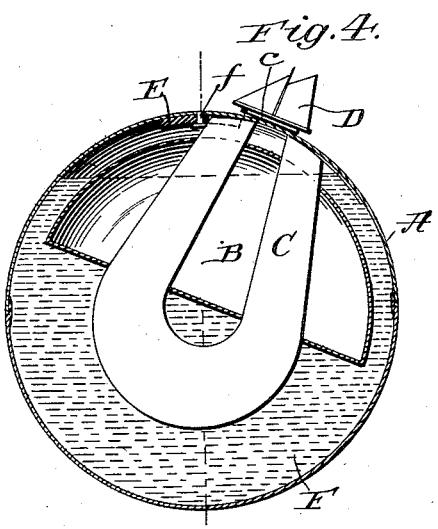
Figure 5:
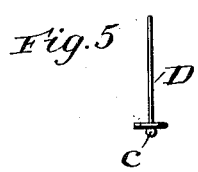
Figure 6:
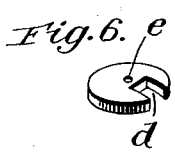
Figure 7:
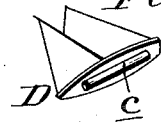

Figure 1 is an elevation of the toy or device; Fig. 2, a section through the globe and float, showing an obstacle placed in the way of the magnet at the point corresponding to the north pole and designed to render difficult the close approximation of such point by the external toy or body; Fig. 3, a view showing the globe in section and the magnet entering a recess in the obstacle and thereby bringing its pole to the nearest practical point of approximation to the pole; Fig. 4, a sectional view, similar to Fig. 2, except that the obstacle in the form of a slotted rotatable disk is turned to permit the magnet-pole to enter, as in Fig. 3. Fig. 5 is an end view of a toy boat suitable for use with the globe; Fig. 6, a perspective view of the slotted disk before referred to, and Fig. 7 a perspective view of the toy boat looking at its under side.

The invention is susceptible of somewhat varied embodiment—as, for instance, by the use of a float of cork or other naturally light substance in lieu of the hollow metallic float, such as herein shown and preferred in practice. The material of which the globe is made may vary and be either of metal, celluloid, or other substance possessing the requisite strength and stiffness and being at the same time reasonably cheap. With this preliminary statement I will now describe the device in detail in its preferred form.

A indicates a hollow globe or sphere made of two hemispherical sections with a protruding lip or flange *a* on one member set back or inward from the exterior surface a distance equal to the thickness of the material of which the globe is made, as will be readily understood upon referring to Figs. 1, 2, 3, and 4. This flange forms a guide and support for the complementary member, the edge of which is closely abutted against the shoulder *b*, formed at the meeting-point of the flange and the body of the hemisphere. If the globe be formed of metal, the flange or lip and the encircling edge of the companion member are "sweated" together—that is to say, they are united by solder previously applied and caused by heat to soften and join the opposing faces firmly to each other. A small surplus of solder is usually applied to fill in the slight angles or shoulders formed by the lip or flange, so as to produce as smooth and even a surface as practicable where the parts are united.

B indicates a float, here represented as a hollow hemisphere, and C a permanent horseshoe-magnet, the poles of which protrude above the hemisphere, while the curve or bow of the magnet is below the same. This arrangement causes the bow or heavier portion of the magnet to act as a weight, tending to hold the base of the float in a horizontal position, and consequently to hold the poles of the magnet at the highest point within the globe, the globe being charged or supplied with a liquid body F to sustain the float, as indicated. The buoyancy of the float is sufficient not only to sustain the magnet, but to cause its poles, which advisably are slightly rounded to conform more or less closely to the interior surface of the globe, to bear always against said surface and ride easily over the slight ridge formed by the flange $a$.

D indicates a toy, here represented as in the form of a sail-boat, for which may, of course, be substituted a steamer, row-boat, or any other object usually found upon or in the water. The lower face of the toy D is provided with a small piece of iron or other magnetic metal $c$, which serves as a keeper for the magnet, and being attracted thereby holds the toy D upon the surface of the globe and causes it to follow the magnet in the movements of the latter or to remain in substantially fixed relation to the magnet while the globe being turned slips between the magnet and the toy. By carefully or skilfully manipulating the globe any given line or path indicated upon the globe or selected by the user may be carried beneath the toy, which will thus seem to traverse the surface of the globe along the predetermined route and from point to point. If the globe be furnished with suitable markings—as, for instance, steamship and sailing routes, cable routes, ocean-currents, the supposed path taken by material during the drift set forth in the well-known "drift theory," &c.—both amusement and information will be gained in attempting to cause the toy to trace these routes.

It is preferred that the magnetic metal or keeper $c$ be of rounded form on its lower side, since this, together with the spherical form of the body on which it rests, causes the toy to shift its position and describe paths other than those intended, thus making it more difficult to keep it on a predetermined course. To further increase the difficulty of following a given line or course, obstructions may be placed on the interior surface of the globe, and these may be either fixed or movable. As the north pole is a point much sought by navigators and explorers, the placing of an obstruction at that point is naturally suggested.

In Figs. 2, 3, and 4 I have shown a disk E, concavo-convex in form, the convex surface conforming quite closely to the concave inner surface of the globe. This disk has a slot or opening $d$ extending from its periphery nearly to the center, sufficient material being left, however, to afford space for a central hole or perforation $e$, through which is passed a rivet $f$, by which the disk is held in position close to the inner surface of the globe, though left sufficiently free to turn without difficulty. Owing to the opening in one side of the disk, that side becomes lighter than the opposite side, and consequently if the globe be turned materially, so as to carry the north pole away from a position in vertical alinement with the center of the globe, the heavier side will naturally tend to drop to the lowest point. When in the position indicated in Figs. 2, 3, and 4, however, the disk will remain in whatever position it happens to be at the moment, unless jarred or otherwise caused to turn. If now it be attempted to bring the toy held or attracted by the magnet to a point directly over the pole, it will be found impossible to do it unless it can be attracted and held over one pole and unless also that pole come opposite or in alinement with the opening $d$. In Fig. 4 the toy is represented as standing over both poles, one pole being entered in the slot or recess, and this causes the toy to approach closely to but not actually to reach the pole. If, however, it can be attracted by the one pole and that pole brought to the position shown in Fig. 4, then the toy may actually reach the point in question. This is suggestive merely and is but one of many forms which the obstruction may take, and it is obvious that, if desired, the rivet may be so tightened as to prevent rotation of the disk E, in which case the location of the recess $d$ could in time be ascertained and the magnet brought thereinto with more or less certainty by those familiar with such location.

The float and the magnet being wholly concealed within the globe and the latter presenting merely the appearance of a small geographical globe, the effect produced upon the mind of the observer when first seeing the boat or other object seemingly gliding over the surface of the globe is very mystifying, and the toy has been found highly entertaining as well as instructive. It can be produced in quantities at a very small cost and serves admirably the double purpose of entertainment and instruction.

While I have represented and found it convenient to use a horseshoe-magnet, it is to be noted that this is entirely optional and that the magnet may take any desired form—as, for instance, a simple bar-magnet, which, however, should be heavier at a point beneath the base of the float than above it, so as to act as a weight to maintain the float in proper position. So, too, a plurality of toys or objects may be used on the exterior of the sphere or globe, and in the case of a bar-magnet they may be placed at opposite points on the globe or opposite the separate poles of the magnet however the latter may be located or whatever its form and the number of its poles.

It will be seen that the essential feature of my invention is the supporting of a magnet within a hollow globe in such manner that the globe may be turned freely in all directions while the magnet maintains a substantially constant position within it. This I mean to claim broadly, regardless of the particular means for supporting the magnet, though liquid and a float obviously afford the simplest and most satisfactory means to that end.

While I have shown the containing body as a hollow globe or sphere, it is to be understood that the invention is not to be restricted to this form, as the body may be other than spherical in contour. So, too, it is conceivable that the magnet may lie loose within the hollow body, in which event upon turning the body or sphere the magnet will change its position within the sphere, and thus attract the magnetic object upon the outer surface thereof. The float form, however, is preferable.

Having thus described my invention, what I claim is—

1. The herein-described device, comprising a hollow body; a liquid body within said hollow body; a float supported by said liquid; a magnet carried by said float; and an external toy or body provided with a bit of magnetic material to serve as a keeper for the magnet and to be attracted thereby.

2. In combination with hollow body A, a liquid body within said hollow body; a float sustained by said liquid; a magnet carried by said float, all within the hollow body; and an external object having a rounded magnetic keeper on its under side to rest upon the surface of the hollow body and to be attracted by the magnet.

3. In combination with a hollow body and a liquid body contained therein, a float within the hollow body; a magnet carried by said float; an external keeper or magnetic body to be attracted by the magnet; and an inward projection within the hollow body, serving to engage the magnet and to move the same from its normal position as the hollow body is rotated.

4. In combination with a hollow body, a liquid body contained within said hollow body; a float sustained by said liquid; a magnet carried by said float; an external keeper for said magnet; and a movable disk or projection applied to the inner surface of the hollow body, having portions at different distances from the center of motion, and serving to force the magnet from or to permit it to maintain its normal position according to the varying positions assumed by the disk relatively to the magnet and to the hollow outer body.

5. In combination with hollow body A, a liquid body contained within said hollow body; a float within said hollow body; a magnet carried by said float; an external keeper for the magnet; and a rotatable disk applied to the inner surface of said hollow body and having an opening from its periphery toward its center.

6. In combination with a hollow body, a floating magnet within said body; and a toy or device D, provided with a magnetic keeper rounded on its under side to facilitate its movement over the surface of the hollow body.

7. In combination with a hollow globe or body, a magnet within said body; a support for said magnet about which said body may be freely tipped and turned in all directions and to any extent while the magnet maintains normally a fixed position; and a keeper for said magnet lying loose upon the external surface of the hollow body.

8. A device of the character described, comprising a hollow body; a magnet contained within said body; a support for the magnet adapted to maintain the latter normally in an upright position, the hollow body being freely rotatable in every direction independently of the magnet and its support; and a keeper for the magnet loose upon the external surface of the hollow body.

In testimony whereof I have signed my name to this specification in the presence of two subscribing witnesses.

HANSON ROBINSON.

Witnesses:
 OSCAR R. BOWMAN,
 JULIUS W. FISCHER.